United States Patent
Elmegreen et al.

(10) Patent No.: US 11,175,305 B2
(45) Date of Patent: Nov. 16, 2021

(54) ACCELEROMETER BASED ON DIAMAGNETIC LEVITATION IN A RING MAGNET

(71) Applicant: International Business Machines Corporation, Armonk, NY (US)

(72) Inventors: Bruce Gordon Elmegreen, Goldens Bridge, NY (US); Oki Gunawan, Westwood, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 39 days.

(21) Appl. No.: 16/520,531

(22) Filed: Jul. 24, 2019

(65) Prior Publication Data
US 2021/0025918 A1   Jan. 28, 2021

(51) Int. Cl.
*G01P 15/18* (2013.01)
*G01P 15/125* (2006.01)

(52) U.S. Cl.
CPC ............ *G01P 15/18* (2013.01); *G01P 15/125* (2013.01)

(58) Field of Classification Search
CPC .................................................. G01P 15/18
USPC ..................................................... 73/514.32
See application file for complete search history.

(56) References Cited

U.S. PATENT DOCUMENTS

| 5,396,136 | A | 3/1995 | Pelrine | |
|---|---|---|---|---|
| 6,679,118 | B1 | 6/2004 | Esashi et al. | |
| 7,225,674 | B2 | 6/2007 | Clark | |
| 7,859,157 | B2 | 12/2010 | Baur | |
| 9,322,838 | B2 | 4/2016 | Kim | |
| 2005/0103104 | A1* | 5/2005 | Berstis | G01V 7/02 73/382 R |
| 2018/0031716 | A1* | 2/2018 | Gunawan | G01V 1/008 |
| 2019/0162751 | A1* | 5/2019 | Elmegreen | G01P 15/18 |

FOREIGN PATENT DOCUMENTS

GB         2359344 A         8/2001

OTHER PUBLICATIONS

Zhang et al. "Single-ring magnetic levitation configuration for object manipulation and density-based measurement." Analytical chemistry 90, No. 15 (2018): 9226-9233. (Year: 2018).*
Pigot, C, et al. "Optimization of a 3D micro-accelerometer based on diamagnetic levitation," X-th International Workshop on Optimization and Inverse Problems in ElectromagnetismSep. 14-17, 2008, Ilmenau, Germany, 3 pages.

* cited by examiner

*Primary Examiner* — Walter L Lindsay, Jr.
*Assistant Examiner* — Philipmarcus T Fadul
(74) *Attorney, Agent, or Firm* — Cantor Colburn LLP; Stosch Sabo

(57) ABSTRACT

A technique relates to a magnetic device and a diamagnetic material positioned to levitate at a three-dimensional minimum of a potential well generated by a magnetic field of the magnetic device.

18 Claims, 13 Drawing Sheets

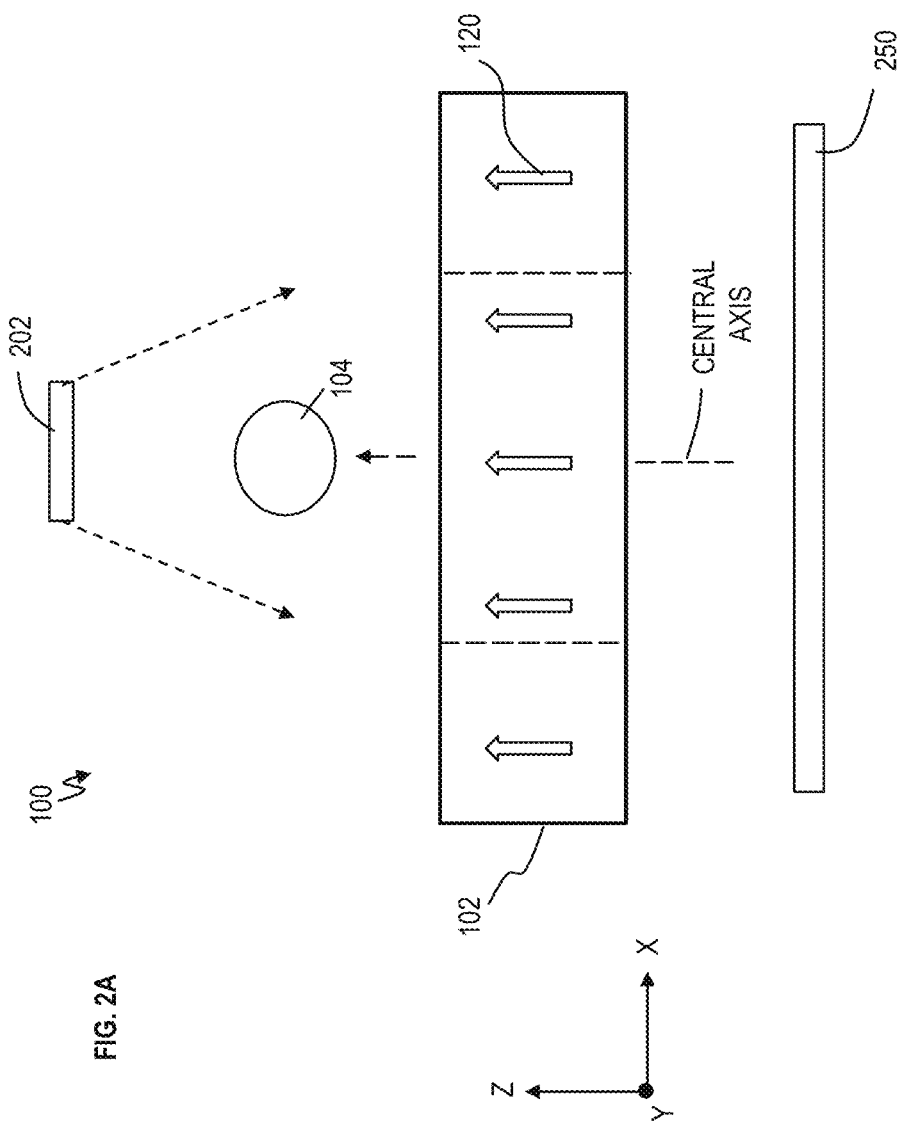

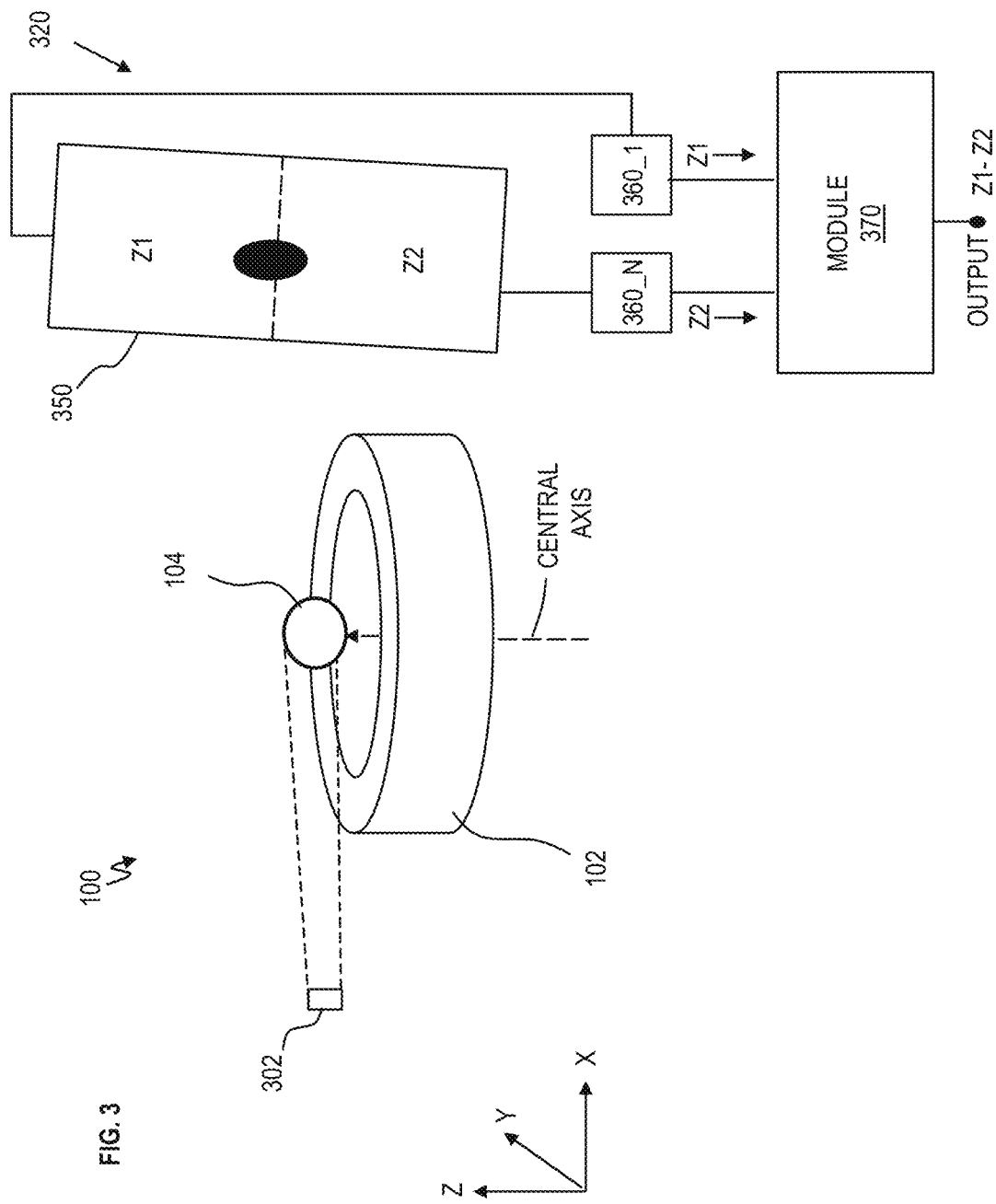

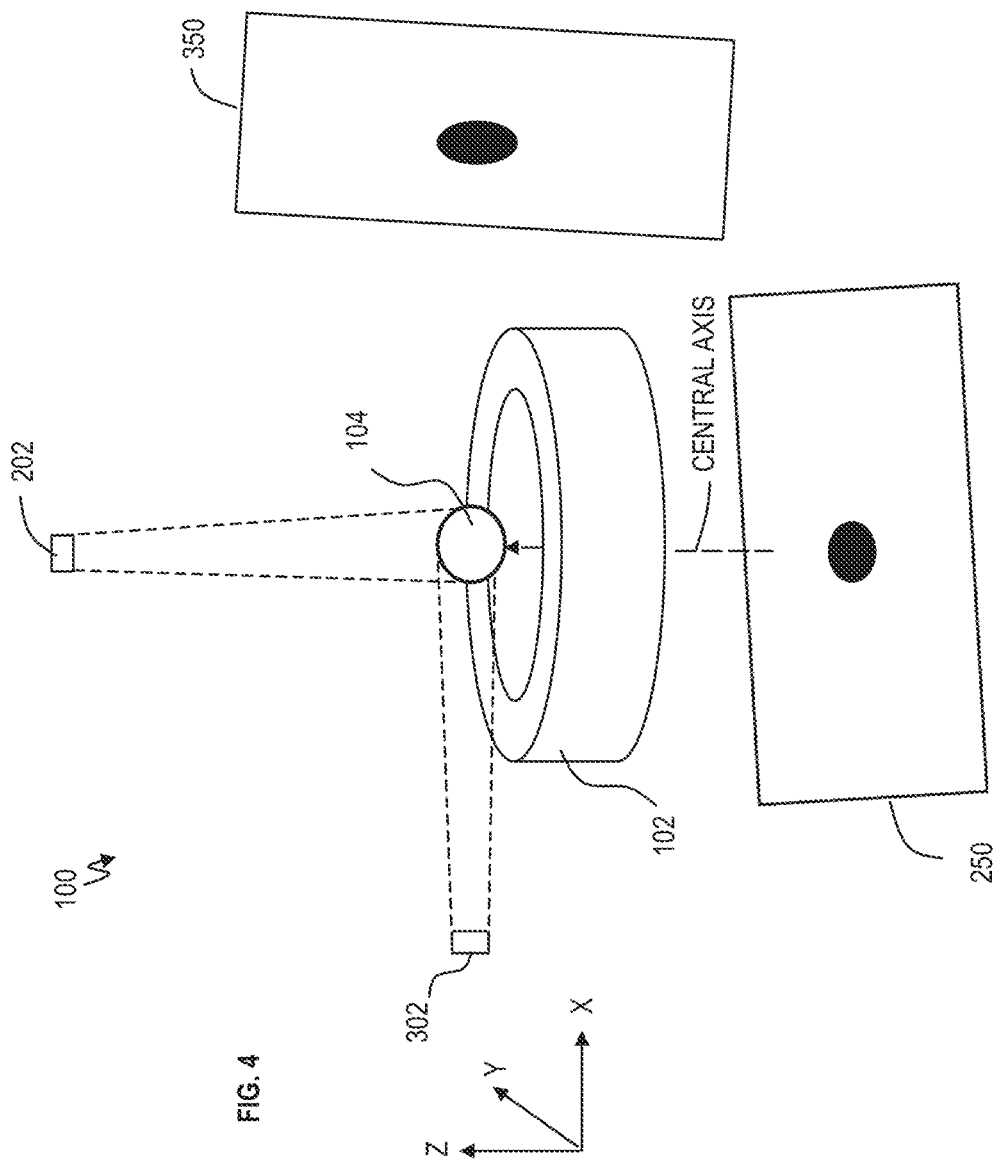

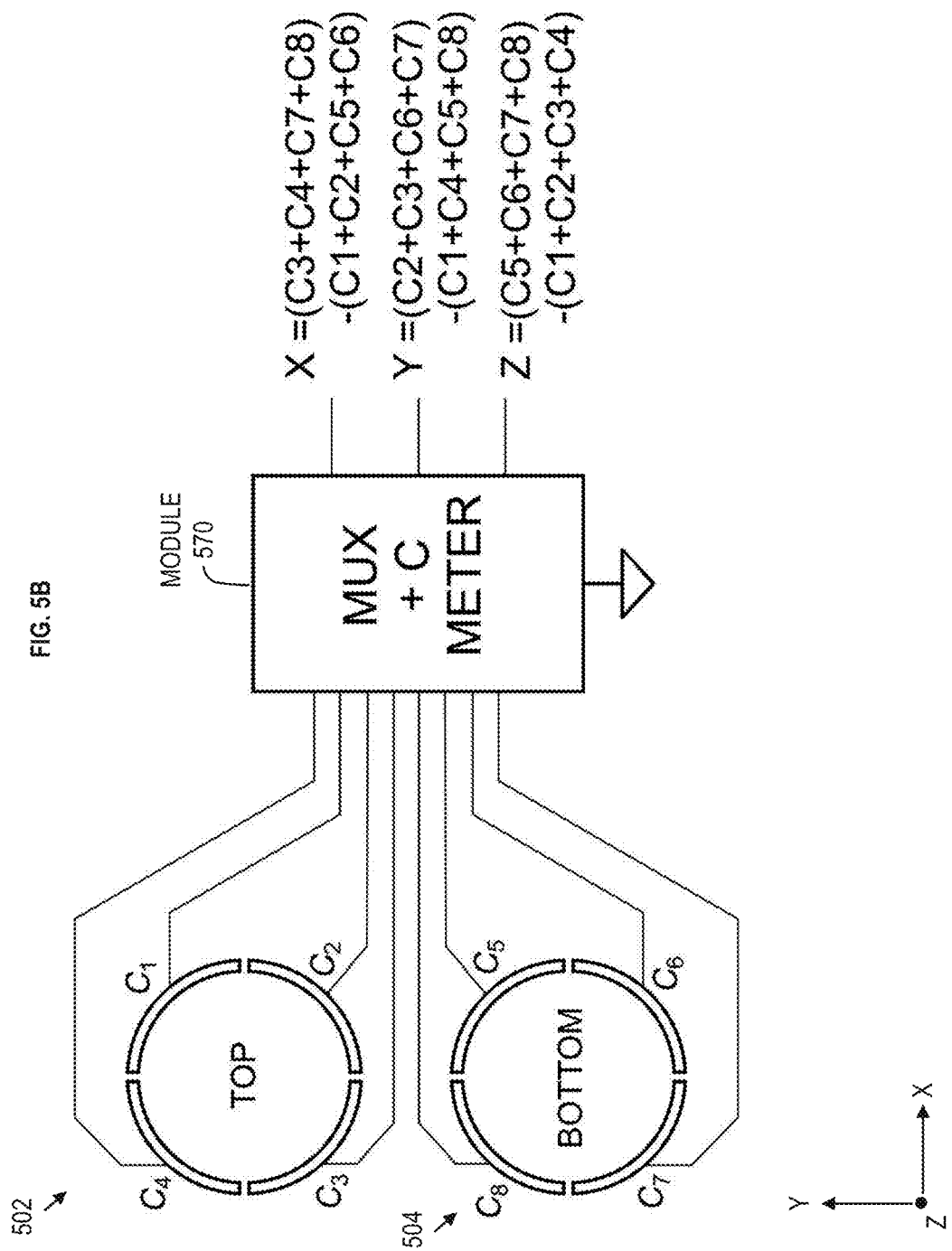

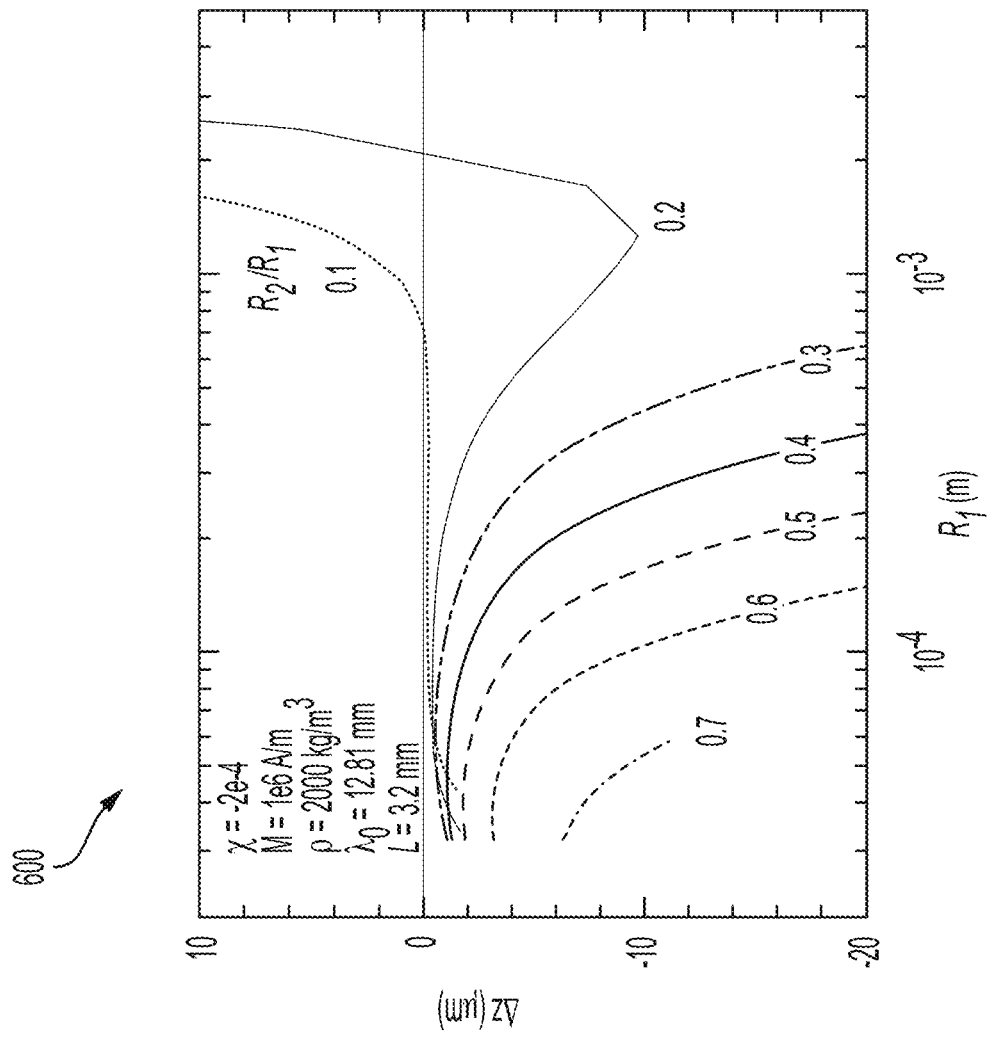
FIG. 6A
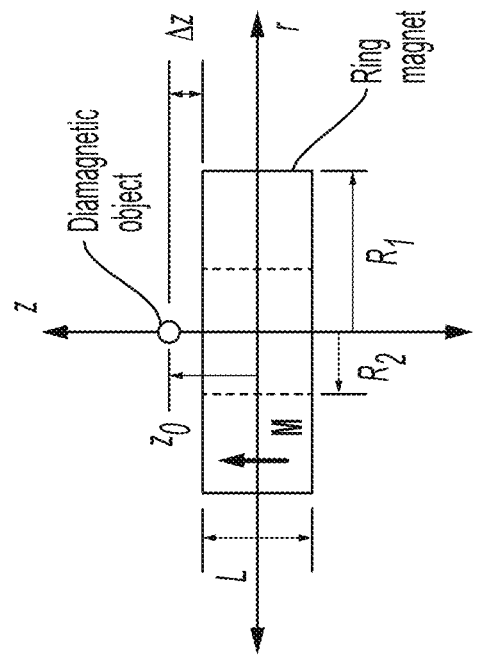

CAPTURE A MOVEMENT OF A DIAMAGNETIC MATERIAL POSITIONED TO LEVITATE AT A THREE-DIMENSIONAL MINIMUM OF POTENTIAL WELL GENERATED BY A MAGNETIC FIELD OF THE MAGNETIC DEVICE 802

DETERMINE ACCELERATION OF THE MAGNETIC DEVICE IN A THREE-DIMENSIONAL SPACE BASED ON THE MOVEMENT OF THE DIAMAGNETIC MATERIAL 804

ACCELEROMETER BASED ON DIAMAGNETIC LEVITATION IN A RING MAGNET

BACKGROUND

The present invention generally relates to fabrication methods and resulting structures for accelerometers, and more specifically, to methods and structures for highly sensitive three-dimensional accelerometers based on diamagnetic levitation in a ring magnet.

An accelerometer is a device that measures acceleration. Accelerometers have multiple applications in industry and science. Highly sensitive accelerometers are components of inertial navigation systems for aircraft, rockets, etc. Accelerometers are used to detect and monitor vibration in rotating machinery. Accelerometers are used in tablet computers and digital cameras so that images on screens are always displayed upright. Accelerometers are used in drones for flight stabilization. Single-axis and multi-axis models of accelerometers are available to detect magnitude and direction of the proper acceleration as a vector quantity and can be used to sense orientation (because direction of weight changes), coordinate acceleration, vibration, shock, and falling in a resistive medium (as in the case where the proper acceleration changes, because it starts at zero and then increases).

SUMMARY

Embodiments of the invention are directed to a device. A non-limiting example of the device includes a magnetic device and a diamagnetic material positioned to levitate at a three-dimensional minimum of a potential well generated by a magnetic field of the magnetic device.

Embodiments of the invention are directed to a method for determining acceleration. A non-limiting example of the method includes capturing a movement of a diamagnetic material positioned to levitate at a three-dimensional minimum of a potential well generated by a magnetic field of a magnetic device and determining acceleration of the magnetic device in a three-dimensional space based on the movement of the diamagnetic material.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2A depicts an example of detecting horizontal motions of a diamagnetic object relative to a ring magnet according to embodiments of the invention;

FIG. 3 depicts an example for detecting z displacements of the diamagnetic object according to embodiments of the invention;

FIG. 4 depicts an example for detecting x, y, and z displacements of the diamagnetic object according to embodiments of the invention;

FIG. 5B depicts example circuitry for determining x, y, and z displacements of the diamagnetic object according to embodiments of the invention;

FIG. 6A depicts a diagram illustrating levitation height above the ring magnet as a function of the outer radius for various ratios of the inner to the outer radius according to embodiments of the invention;

FIG. 8 depicts a flowchart of a method for determining acceleration using the accelerometer according to embodiments of the invention.

Figure 1:
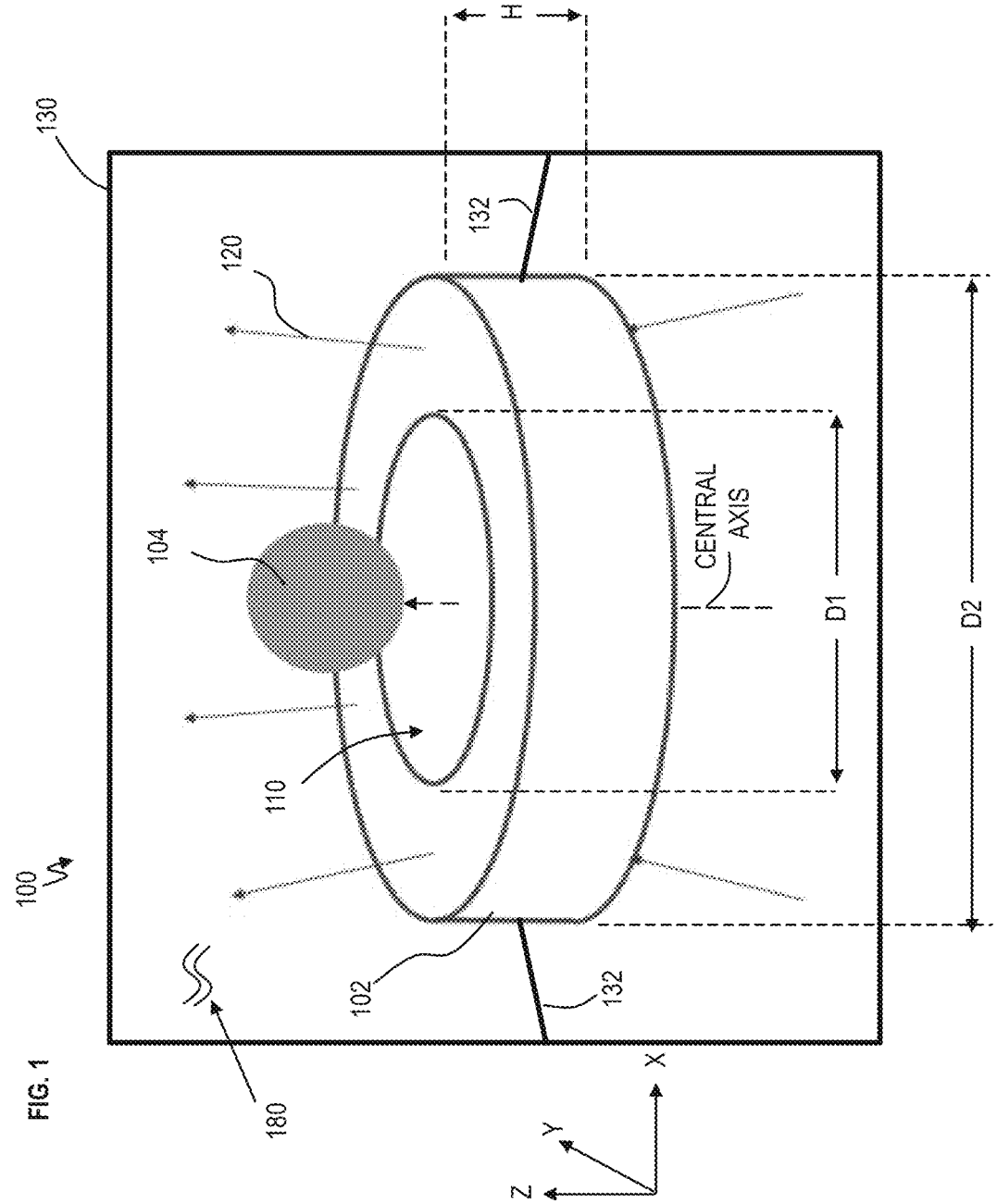
FIG. 1 depicts an example three-dimensional accelerometer according to embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices, magnetic devices, and semiconductor-based ICs are well known and so, in the interest of brevity, many conventional steps will only be mentioned briefly herein or will be omitted entirely without providing the well-known process details.

Turning now to an overview of technologies that are more specifically relevant to aspects of the invention, accelerometers are in use for inertial navigation systems, vibration and mechanical noise detection, orientation of mobile computer screens, drone flight stabilization, orientation sensing, hand-held components of video games, motion sensing in medical and biological devices, and other things. State-of-the-art accelerometers are made of micro-machined cantilevers with piezoelectric detection of position. A mass source at the end of the cantilever resists motion because of its inertia when the housing around it accelerates. The relative position between the mass source and the housing is then detected. Thus, known accelerometer designs require mechanical attachment between the mass object and the housing. Because of the need to connect the massive object to the housing along at least one axis, existing accelerometers cannot be fully three dimensional, which means state-of-the-art accelerometers are not free to sense acceleration simultaneously in three directions.

Turning now to an overview of the aspects of the invention, one or more embodiments of the invention provide sensitive three-dimensional accelerometers and methods for using the same. In accordance with aspects of the invention, the three-dimensional accelerometer is configured to require no mechanical attachment between the mass object and the housing. The accelerometers can include a thick ring of permanent magnetic material with a levitated diamagnetic object on the central axis of the ring of permanent magnetic material. Accelerations of this accelerometer in two directions parallel to the ring plane can be determined from the relative horizontal motion of the levitated object. Accelerations in the vertical direction can be determined from the relative vertical/perpendicular motion above the ring. These horizontal motions in the parallel directions and vertical motions in the perpendicular directions can be detected in various ways including using light cast onto photodetectors, using a capacitive detection system, using images by a charge coupled device, etc. The accelerometer has no internal friction aside from viscosity in the air or other fluid surrounding the diamagnetic object. The viscosity of the fluid or air can be tuned and/or can be set to zero if in a vacuum. Potential uses of the accelerometer can include motion and vibration sensing, ultrasensitive acoustic sensing, sensing of slight variations in tilt relative to gravity, etc. Low power operation is possible, allowing remote sensing of small motions when combined with wireless transmission of data.

Turning now to a more detailed description of aspects of the present invention, FIG. 1 depicts an example of a three-dimensional accelerometer 100 according to embodiments of the invention. The accelerometer 100 includes a thick ring of strongly magnetic material depicted as a ring magnet 102 (or just ring) and a diamagnetic object 104 levitating on the central axis of the ring magnet 102. FIG. 1 illustrates the ring magnet 102 with the magnetic field depicted as magnetic field arrows 120 pointing perpendicular to the top and bottom surfaces of the ring magnet 102.

The diamagnetic object 104 acts as the inertial mass for the accelerometer 100, which is the mass object. The diamagnetic object 104 has 3 degrees of magnetically constrained motion and touches no solid surface. Diamagnetism causes the diamagnetic object 104 to generate an internal magnetic moment in the presence of an external magnetic field from ring magnet 102 and the internal magnetic moment of the diamagnetic object 104 opposes the external magnetic field seen as magnetic field arrows 120. This internal moment causes the diamagnetic object 104 to repel away from the external magnetic field of the ring magnet 102. Example materials of the diamagnetic object 104 having strong diamagnetic properties can include pyrolytic carbon, bismuth, silver, graphite, and superconducting materials.

A housing 130 is physically connected to the ring magnet 102. In some examples, the ring magnet 102 can be physically positioned to and/or rigidly fixed to the housing 130. In some examples, structural members 132 can be physically connected to both the housing 130 and the ring magnet 102 so as to provide a rigid connection between the housing 130 and ring magnet 102. The rigid connection between the structural members 132, housing 130, and ring magnet 102 prevents one from rotating with respect to the other. Although two structural members 132 are shown it should be appreciated that more or fewer structural members 132 can be utilized. Although the structural members 132 are connected to the sides of the ring magnet 102, the structural members 132 can be physically connected to the top, bottom, sides, and any combination thereof of the ring magnet 102 in any form as along as the structural members 132 and the housing 130 do not affect the freedom of movement of the diamagnetic object 104. The housing 130 and structural members 132 can be formed of materials that are not magnetic. Example materials of the housing 130 and structural members 132 can include non-magnetic metals, non-magnetic metal alloys, plastics, glue, etc.

The magnetic field (depicted by magnetic field arrows 120) near the central axis of the ring magnet 102 has a local minimum in energy density. The central axis, as shown by dashed lines, extends vertically through the center of the ring magnet 102. The diamagnetic object 104 placed at this local minimum is repelled by the surrounding magnetic field (depicted by magnetic field arrows 120) in all directions. If the force of repulsion in the vertical direction balances the weight of the diamagnetic object 104 in the opposite direction, then the diamagnetic object 104 will levitate in the earth's gravitational field and not touch any of the magnetic material of the ring magnet 102, as depicted in FIG. 1. The vertical axis is depicted on the z-axis, which is parallel to the central axis.

Figure 7:
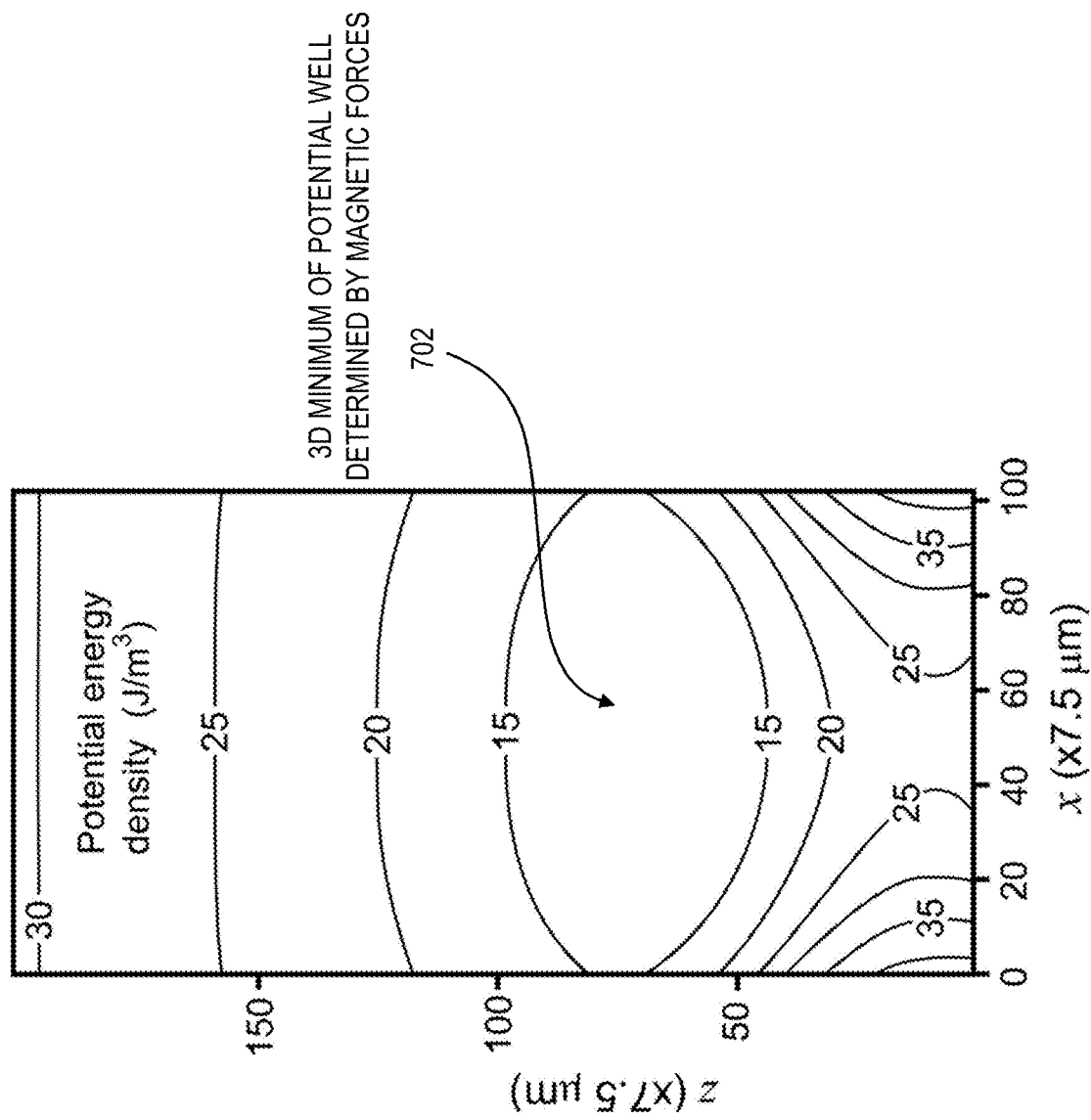
FIG. 7 depicts a model of the total potential energy density in the three-dimensional accelerometer according to embodiments of the invention.

The stability of the levitation can be determined from the Jacobian (second derivative matrix) of the total potential energy density including gravity and magnetic potential in a three-dimensional (3D) space. If this Jacobian has positive eigenvectors, as for example, when the Jacobian matrix is diagonal with positive values, then the repelling force increases in all directions and the diamagnetic object 104 is stable in its levitated position. This represents the equilibrium state for the system (i.e., ring magnet 102 and diamagnetic object 104). According to embodiments of the invention, the diamagnetic levitation on the central axis of the ring magnet 102 discussed herein is a stable system, as depicted in FIG. 7. FIG. 7 depicts a model of the total potential energy density (in J/m$^3$) for the diamagnetic object 104 suspended above the ring magnet 102. In FIG. 7, the image illustrates the top half of the model. The ring of the magnet is horizontal at the bottom, with half of the magnet's thickness sticking up and the other half underneath the image. In this example, the dimensions of the ring magnet 102 are 0.3 mm inner radius, 1.2 mm outer radius, and 0.75 mm height. The magnetic field density in the ring magnet 102 is $10^6$ amperes/meter, the magnetic susceptibility of graphite is $-2\times10^{-4}$, and the density of graphite is 2000 kg/m$^3$. The graphite as diamagnetic object 104 sits at the minimum 702 of the total energy in the center of the inner contour where the minimum is at the vertical position of 68, which is 18 units above the top of the magnet as depicted in FIG. 7. The scale is 100 units per 0.75 mm. The graphite is stable because the graphite is at the minimum 702 of the total energy and because both Jacobean derivatives are positive at that position. The total magnetic field strength is evaluated as the square root of the sum of the squares of each component, which are the x, y, and z components of the Jacobian.

Referring back to FIG. 1, the diamagnetic object 104 is displaced from its equilibrium state relative to the surrounding ring magnet 102 when the ring magnet 102 is moved, because the inertia from the mass of the diamagnetic object 104 causes the diamagnetic object 104 to resist movement in an absolute sense. A measurement of this mass displacement of the diamagnetic object 104 relative to the ring magnet 102 is thus a measurement of the acceleration of the ring magnet 102 itself, and thus of the acceleration of the whole device (i.e., the housing 130 (including the ring magnet 102 and the diamagnetic object 104) which can be rigidly fixed to another system such as an aircraft, vehicle, rocket, car, boat, etc.). Because such magnetic levitation has no mechanical connections between the diamagnetic object 104 and the surrounding ring magnet 102 fixed to surrounding housing 130 but only magnetic field gradients that hold the diamagnetic object 104 in place, the diamagnetic object 104 is free to move relative to the ring magnet 102 rigidly fixed to housing 130, subject only to viscous drag in the intervening medium 180 if the acceleration is not too large. An acceleration that is too large would displace the diamagnetic object 104 from all equilibrium positions and cause diamagnetic object 104 to fall off the ring magnet 102. This would occur if the product of the acceleration and the mass of the diamagnetic object 104 exceeds the magnetic force that holds the diamagnetic object 104 in equilibrium. The housing 130 can contain a medium 180 that encompasses the diamagnetic object 104. The medium 180 can be a fluid medium such as a liquid/fluid and/or a gas medium such as air, a vacuum, etc. Example liquids/fluids as the medium 180 can include ether, water, or propyl alcohol, in order of increasing viscosity. Example gases as the medium 180 can include benzene, nitrogen or neon, in order of increasing viscosity.

Viscous drag from the intervening medium 180 can be tuned by the use of various liquids and/or gases to provide the intended damping for the relative motion of the diamagnetic object 104 with respect to the ring magnet 102. With small damping, the accelerometer 100 detects a wide range of acceleration frequencies as the diamagnetic object 104 moves with a speed equal to the integral over time of the past accelerations, convolved with the exponential damping function from the viscosity. With a damping time equal to the inverse of the natural oscillation frequency, motions at that frequency can be sensitively detected. Operation of the accelerometer with no fluid medium is also contemplated if the housing 130, ring 102 and diamagnetic object 104 are in a vacuum. Vacuum conditions would minimize noise in the relative acceleration of the diamagnetic object 104 that might arise from random collisions with fluid molecules, i.e., Brownian motion.

For the ring magnet design, the diamagnetic object 104 can be a spherical piece of graphite that is comparable in size to, or smaller than, a hole 110 in the magnetic ring axis. An example diameter of diamagnetic object 104 as a sphere is about 0.5 mm. The size of the sphere is not meant to be limited. The sphere is smaller than the hole so that the shadow of the sphere can be fully seen from below the ring and its position measured as discussed further herein. In some examples, when the sphere is the same size as the hole, then the edges of the shadow cannot be seen from below when the shadow is utilized for measurement purposes; accordingly, spheres comparable in size to the hole, or even larger, would be allowed for the method of detection based on capacitance.

The hole 110 can have diameter D1, while the ring magnet 102 has a larger diameter D2. An example of diameter D1 for the hole 110 is about 1 mm for the half-mm-size sphere. An example of diameter D2 for the ring magnet 102 is about 1 cm for the mm-size sphere. This diamagnetic object 104 is free to move in all three dimensions, along the x-axis, y-axis, and z-axis, without touching any structures. One restoring force from magnetism on the diamagnetic object 104 is in the cross-sectional direction (e.g., the x-axis and/or y-axis) of the ring magnet 102, confining the motion (of the diamagnetic object 104) there. Another force from magnetism, which is approximately 4 times stronger, is in the vertical direction (i.e., the z-axis), allowing less motion of the diamagnetic object 104 in the vertical direction.

Figure 2B:
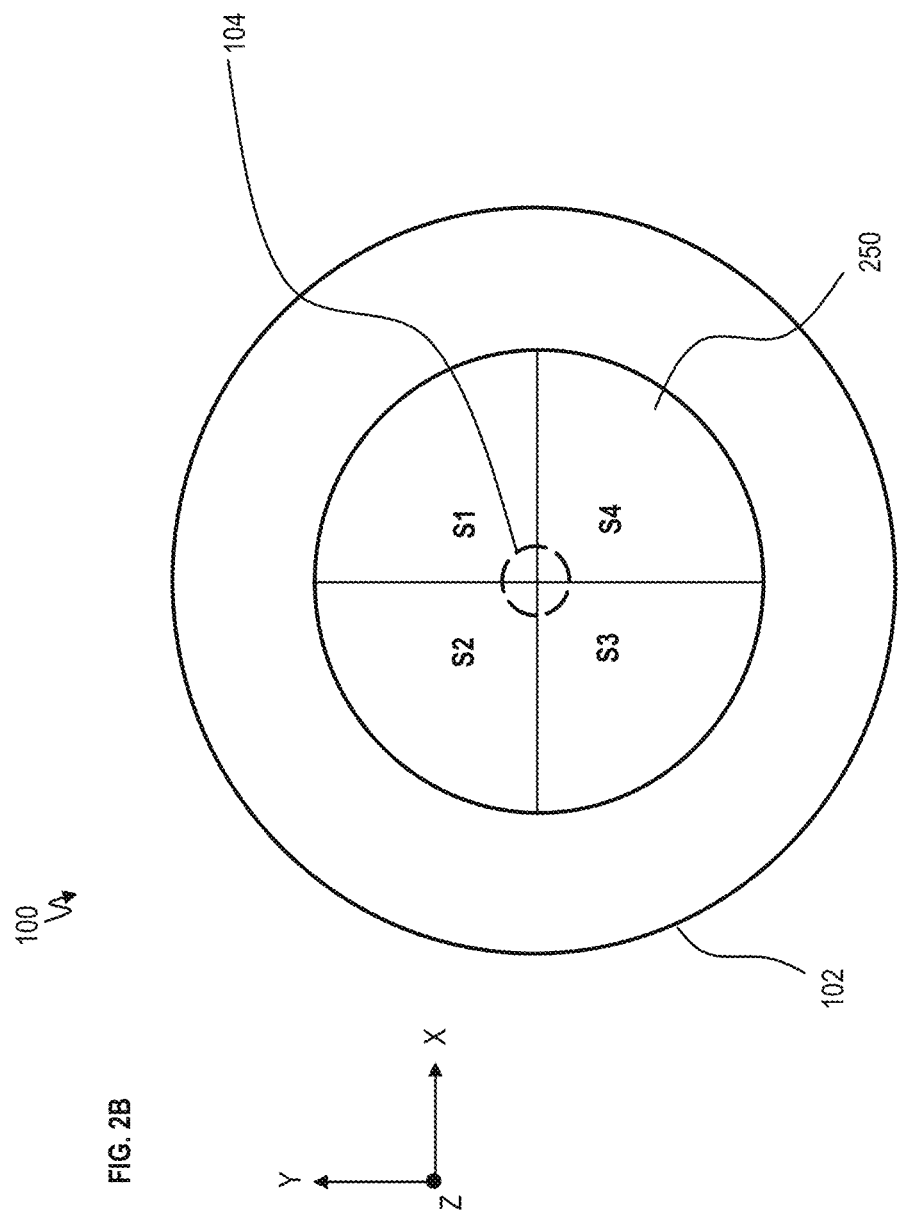
FIG. 2B depicts a top view of an example detector behind/below the ring magnet according to embodiments of the invention.
Figure 2C:
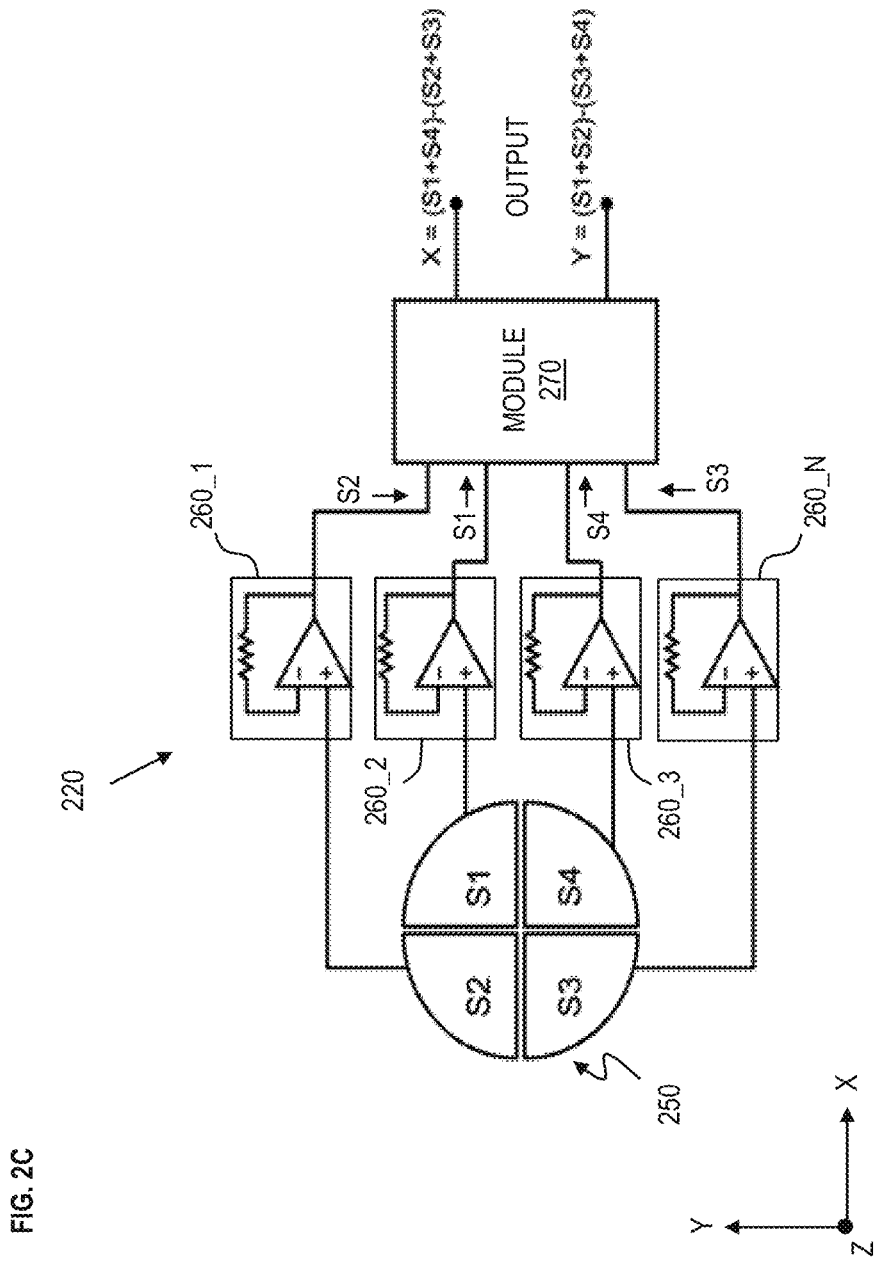
FIG. 2C depicts an example for detecting x and y displacements of the diamagnetic object according to embodiments of the invention.

The accelerometer 100 can be utilized to detect motion or acceleration in the x, y, and z axes according to embodiments. Although some examples are discussed below, it should be appreciated that the examples are for illustrative purposes and not limitation. FIG. 2A depicts an example of the ring magnet 102, levitated diamagnetic object 104, one or more light sources 202 above the ring magnet 102, and a light quadrant photodetector 250 below the ring magnet 102 to detect horizontal motions of the diamagnetic object 104 relative to the ring magnet 102 according to embodiments of the invention. FIG. 2B depicts a top view of the photodetector 250 behind/below the ring magnet 102 and the light source 202 (not shown in FIG. 2B) is above. FIG. 2C depicts example quadrant photodetector circuitry 220 that yields the x and y displacement signals of the diamagnetic object 104.

Although an example of measuring the relative position of diamagnetic object 104 and ring magnet 102 is discussed in FIGS. 2A, 2B, 2C, the relative position of the diamagnetic object 104 and the ring magnet 102 just below it can be measured in a variety of ways without interfering with the magnetic repulsive force that holds the diamagnetic object 104 in place. One way is to have light sources cast light from the top or bottom of the system and to have two dimensional photoelectric detectors, such as a CCD (charged coupled device) camera, a 4-way split photodetector, etc., on the opposite side of the light source to measure the horizontal position of the shadow of the diamagnetic object 104. FIG. 2A shows the example with the light source 202 above the accelerometer 100 so as to cast a shadow of the diamagnetic object 104 on the photodetector 250. An example can reverse the positions of the light source 202 and photodetector 250 such that the light source 202 is below ring magnet 102 and the photodetector 250 is above, all while the diamagnetic object 104 remains in the same position above the ring magnet 102. Analogously, the vertical position of the diamagnetic object 104 can be measured similarly using one or more light sources 302 and a photodetector 350 on the side as depicted in FIG. 3.

When the diamagnetic object 104 moves relative to the ring magnet 102 fixed to housing 130, the shadow of the diamagnetic object 104 moves relative to the photodetector 250 in FIG. 2A for horizontal/lateral displacement (e.g., in the x-axis and/or y-axis) and/or the shadow of diamagnetic object 104 moves relative to the photodetector 350 in FIG. 3 for vertical displacement (e.g., in the z-axis). Accordingly, the horizontal position of the light reaching the photodetector 250 and the vertical position of the light reaching photodetector 350 change with time. These horizontal and vertical positions are the relative three-dimensional position of the diamagnetic object 104.

As further example details of the measurement process, FIG. 2B illustrates that the photodetector 250 can be split into 4 quadrants S1, S2, S3, S4. The light source 202, photodetector 250, ring magnet 102, and housing 130 are all rigidly connected such that one does not move independently of the other. The accelerometer 100 can have a null or zero position when there is no movement or acceleration, and the null/zero position is denoted by the shadow being in the center of the photodetector 250, for example, a shadow of the diamagnetic object 104 is equally or nearly equally cast on the 4 quadrants S1, S2, S3, S4 of the photodetector 250. As light is emitted from the light source 202 and when the ring magnet 102 moves, the shadow of the diamagnetic object 104 moves on the photodetector 250, thereby reducing the amount of light received by one or more quadrants S1, S2, S3, S4 while increasing the amount of light received by one or more quadrants. Referring to the detection circuity 220 in FIG. 2C, detection modules 260_1 through 260 N are individually connected to the quadrants S1, S2, S3, S4 of the photodetector 250 to receive and detect the level of voltage and/or current from the respective quadrants S1, S2, S3, S4 of the photodetector 250, as light from light sources 202 is emitted. When the shadow of the diamagnetic object 104 has moved to cover more (or cover all) of any quadrant, that quadrant receives less light (or no light) from the light source 202, and therefore has a lower voltage level and/or lower current level as detected by the respective detection modules 260_1 through 260_N. Conversely, when the shadow of the diamagnetic object 104 moves to uncover more (or uncover all) of any quadrant, that quadrant receives more light from the light source 202, and therefore has a higher voltage level and/or higher current level as detected by the respective detection modules 260_1 through 260 N. In some examples, the detection modules 260_1 through 260 N can include digital circuit elements, analog circuit elements (e.g., such as operational amplifier, resistors, etc.), and/or a combination of digital and analog circuit elements. An analysis module 270 is configured to receive signals S1, S2, S3, S4 output from the detection modules 260_0 through 260 N, the signals S1, S2, S3, S4 respectively corresponding to quadrants S1, S2, S3, S4. The analysis module 270 is configured to determine the x displacement/acceleration and the y displacement/acceleration of the diamagnetic object 104 relative to the ring magnet 102, according to the movement of the shadow of diamagnetic object 104 on photodetector 250. To determine positive or negative displacement/acceleration in the y-axis, the analysis module 270 determines the following expression for signals S1, S2, S3, S4: $y=(S1+S2)-(S3+S4)$. To determine positive or negative displacement/acceleration in the x-axis, the analysis module 270 determines the following expression for signals S1, S2, S3, S4: $x=(S1+S4)-(S2+S3)$. A positive y value means that more light is reaching S1 and S2 than is reaching S3 and S4, so the displacement/acceleration of the ring magnet 102 and housing 130 relative to the diamagnetic object 104 is in the positive y direction on the y-axis, while a negative y value means displacement/acceleration in the negative y direction on the y-axis. A zero y value means no displacement/acceleration in the y direction. Similarly, a positive x value means displacement/acceleration in the positive x direction on the x-axis, while a negative x value means displacement/acceleration in the negative x direction on the x-axis. A zero x value means no displacement/acceleration in the x direction. It is noted that measurement in the x-axis and y-axis is not limited to the example discussed herein. In some example, more than 4 quadrants can be utilized. The advantage of using the split photodetector scheme is that the detection can be high resolution and high bandwidth. There could be a tradeoff of limited dynamic range due to limited size of the sphere, i.e., when the sphere is out of the center of the photodetectors the signal saturates. In some examples where the photodetector 250 (or photodetector 350 in FIG. 3) is a CCD camera, using the CCD camera for motion detection might have lower resolution and lower bandwidth than a split photodetector, but the advantage is that a system with a CCD camera can have a very high dynamic range as the sphere's movement can be detected across the whole surface of the CCD camera.

FIG. 3 depicts an example using one or more light sources 302 and a photodetector 350 to measure and detect vertical motions of the accelerometer 100 in the z-axis according to embodiments of the invention. The light source 302 emits light onto the side of the diamagnetic object 104, and a shadow of the diamagnetic object 104 is cast on the photodetector 350. The photodetector 350 can be analogous to the photodetector 250, except the photodetector 350 is depicted as having 2 quadrants Z1, Z2. In some examples, the photodetector 350 can have more than 2 quadrants. Quadrant photodetector circuitry 320 can be analogous to quadrant photodetector circuitry 220, except the photodetector circuity 320 is depicted as having 2 detection modules 360_1 and 360_N. Detection modules 360_1 and 360_N can be respectively connected to quadrants Z1 and Z2 of the photodetector 350. The detection modules 360_1 and 360_N are analogous to the detection modules 260_1 through 260_N.

The light source 302, photodetector 350, ring magnet 102, and housing 130 are all rigidly connected such that one does not move independently of the other. The accelerometer 100 can have a null or zero position when there is no movement or acceleration in the z-axis, and the null/zero position is denoted by the shadow being in the center of the photodetector 350, for example, a shadow of the diamagnetic object 104 is equally or nearly equally cast on the 2 quadrants Z1, Z2 of the photodetector 350. As light is emitted from the light source 302 and when the ring magnet 102 moves, the shadow of the diamagnetic object 104 moves (vertically) on the photodetector 350, thereby reducing the amount of light received by one of the quadrants Z1, Z2 while increasing the amount of light received by the other one of the quadrants Z1, Z2. Referring to the detection circuity 320 in FIG. 3, detection modules 360_1 through 360_N are individually connected to the quadrants Z1, Z2 of the photodetector 350 to receive and detect the level of voltage and/or current from the respective quadrants of the photodetector 350. When the shadow of the diamagnetic object 104 has moved to cover more (or cover all) of any one of the quadrants Z1, Z2, that quadrant receives less light (or no light) from the light source 302, and therefore has a lower voltage level and/or lower current level as detected by the respective detection modules 360_1 through 360_N. Conversely, when the shadow of the diamagnetic object 104 moves to uncover more (or uncover all) of any one of the quadrants Z1, Z2, that quadrant receives more light from the light source 202, and therefore has a higher voltage level and/or higher current level as detected by the respective detection modules 360_1 through 360_N. An analysis module 370 is configured to receive the signals Z1, Z2 output from the detection modules 360_1 through 360_N, where the signals Z1, Z2 respectively correspond to quadrants Z1, Z2. The analysis module 370 is configured to determine the z displacement/acceleration. To determine positive or negative displacement/acceleration in the z-axis, the analysis module 370 is configured to determine the following expression for signals Z1, Z2: $z=Z1-Z2$. A positive z value means displacement/acceleration of the magnet 102 relative to the diamagnetic object 104 in the positive z direction, while a negative z value means displacement/acceleration in the negative z direction. A zero means no vertical motion.

FIG. 4 depicts an example of three-dimensional detection and measurement according to embodiments of the invention. Although some details are omitted for conciseness, FIG. 4 represents the descriptions in FIGS. 1, 2A, 2B, 2C, and 3 and illustrates simultaneous measurements in the x-axis, y-axis, and z-axis. When the diamagnetic object 104 moves in the x direction and/or y direction, the photodetector circuitry 220 detects, measures, and determines the acceleration/displacement of the diamagnetic object 104 in the x direction and/or y direction as discussed herein. When the diamagnetic object 104 moves in the z direction, the photodetector circuitry 320 detects, measures, and determines the acceleration/displacement of the diamagnetic object 104 in the z as discussed herein.

Figure 5A:
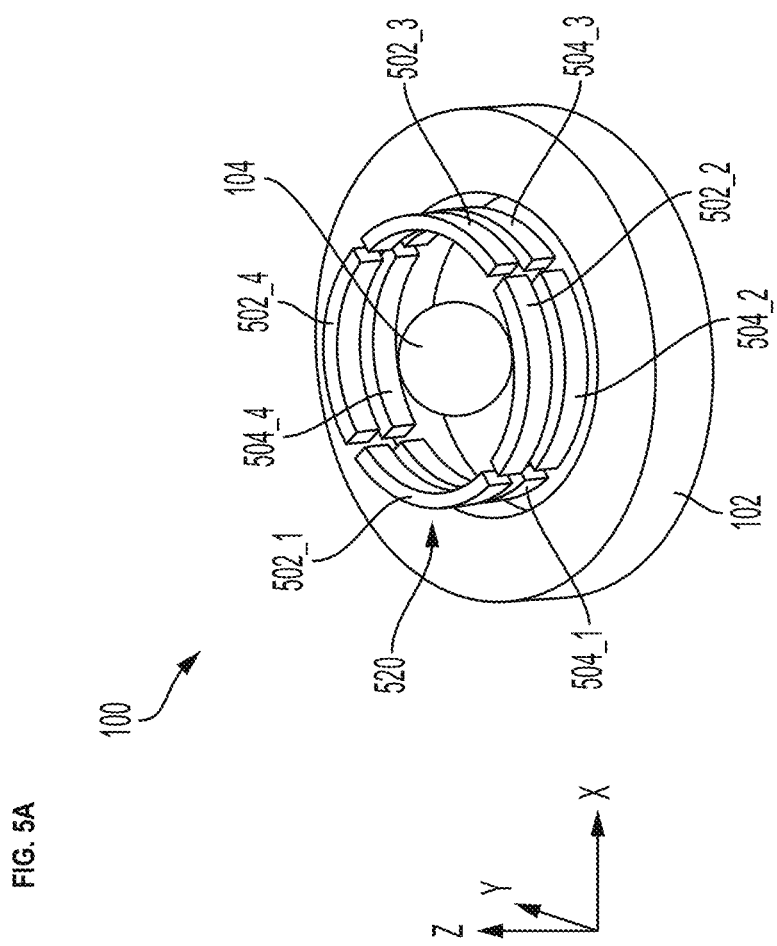
FIG. 5A depicts an example using conducting strips for measuring horizontal and vertical positions of the levitating diamagnetic object according to embodiments of the invention.

There can be other ways of detecting and measuring the horizontal and vertical motions of the accelerometer 100. FIG. 5A depicts an example with conducting strips 520 on top of the ring magnet for measuring the horizontal and vertical positions of the levitating diamagnetic object 104. The position of the diamagnetic object 104 relative to the ring magnet 102 can be measured by capacitance and/or voltage if upper conducting strips 502_1, 502_2, 502_3, 502_4 and lower conducting strips 504_1, 504_2, 504_3, 504_4 are placed on top of (e.g., fixed to) the ring magnet 102 and insulated from the ring magnet 102. The upper conducting strips 502_1, 502_2, 502_3, 502_4 can generally be referred to as upper conducting strips 502. The lower conducting strips 504_1, 504_2, 504_3, 504_4 can generally be referred to as lower conducting strips 504. The upper conducting strips 502 and lower conducting strips 504 can include various conducting materials such as metals. Example conducting materials can include copper, aluminum, carbon nanotubes, metal alloys, etc.

As the diamagnetic object 104 moves closer to or further away from a set of the upper conducting strips 502 and lower conducting strips 504, the capacitance relative to ground and/or current using oscillating voltage (i.e., impedance) in the conducting strips correspondingly increases or decreases. FIG. 5B depicts example module 570 that yields the x, y, and z displacements/accelerations of the diamagnetic object 104. Module 570 includes functions of measurement devices such as a capacitance meter, current meter, and voltmeter. Additionally, module 570 includes functions of a multiplexer and arithmetic circuit/device. In FIG. 5B, the upper conducting strips 502_1, 502_2, 502_3, 502_4 are identified as upper conducting strips 502 and each is operatively connected to the module 570. Similarly, the lower conducting strips 504_1, 504_2, 504_3, 504_4 are identified as lower conducting strips 504 and each is operatively connected to module 570. The module 570 is configured to measure the capacitance relative to ground and/or impedance in each of upper conducting strips 502 and lower conducting strips 504. Measurement of changes in capacitance and/or current can determine the relative position of the diamagnetic object 104 in all three dimensions (x, y, and z directions) according to the movement to the ring magnet 102. Accordingly, the detection module 570 determines the relative movement of the diamagnetic object 104 in the x direction, y direction, and z direction based on the changes in capacitance and/or current for each set.

Examples of determining acceleration in the x-axis with respect to FIGS. 5A and 5B are below. For ease of understanding, the upper conducting strips 502_1, 502_2, 502_3, 502_4 of upper conducting strips 502 are generally represented as C1, C2, C3, C4 and an example x, y, z orientation is shown in FIG. 5B. The lower conducting strips 504_1, 504_2, 504_3, 504_4 of lower conducting strips 504 are generally represented as C5, C6, C7, C8. Since each of the upper conducting strips 502_1, 502_2, 502_3, 502_4 and lower conducting strips 504_1, 504_2, 504_3, 504_4 is individually connected to the module 570 by conducting wires, the module 570 can measure capacitance relative to ground and/or impedance in any strip. The detection module 570 detects and measures increases and decreases in capacitance relative to ground and/or impedance of upper conducting strips and lower conducting strips, and determines a value corresponding to movement of the diamagnetic object 104. For ease of understanding and explanation purposes, capacitance is measured according the example x, y, z orientation in FIG. 5B. As an example, the module 570 is configured to measure the capacitance relative to ground of C1, C2, C5, and C6. Similarly, the module 570 is configured to measure the capacitance relative to ground of C3, C4, C7, and C8. To determine movement in the x direction, the module 570 is configured to determine the following expression: $X=(C3+C4+C7+C8)-(C1+C2+C5+C6)$. When the value of X is positive, this means that the housing 130 and ring magnet 102 have moved in the positive x direction relative to the diamagnetic object 104. On the other hand, when the value of X is negative, this means that the ring magnet 102 and housing 130 have moved in the negative x direction relative to the diamagnetic object 104.

Examples of determining acceleration in the y-axis are below. The detection module 570 detects and measures increases and decreases in capacitance relative to ground and/or impedance between any conducting strip and the diamagnetic object 104, and determines a value corresponding to movement of the diamagnetic object 104 in the y direction. Capacitance relative to ground or impedance measured by current using oscillating voltage relative to ground of any strip increases when the diamagnetic object 104 gets closer to the strip. For ease of understanding and explanation purposes, capacitance relative to ground is measured according the example x, y, z orientation in FIG. 5B. As an example, the module 570 is configured to measure the capacitance relative to ground of C1, C4, C5, and C8. Similarly, the module 570 is configured to measure the capacitance relative to ground of C2, C3, C6, and C7. To determine movement in the y direction, the module 570 is configured to determine the following expression: $Y=(C2+C3+C6+C7)-(C1+C4+C5+C8)$. When the value of Y is positive, this means that the housing 130 and ring magnet 102 have moved in the positive y direction relative to the diamagnetic object 104. On the other hand, when the value of Y is negative, this means that the ring magnet 102 and housing 130 have moved in the negative y direction relative to the diamagnetic object 104.

Examples of determining acceleration in the z-axis in FIGS. 5A and 5B are below. The detection module 570 detects and measures capacitance relative to ground and/or impedance in upper conducting strips 502_1 through 502 N and lower conducting strips 504_1 through 504_N, and determines a value corresponding to movement of the diamagnetic object 104 in the z direction. When the value of the difference between the sum of the capacitances relative to ground of the upper capacitance strips 502 and the sum of the capacitances relative to ground of the lower capacitance strips 504 is positive, then the module 570 outputs that the diamagnetic object 104 has moved in the positive z direction relative to the housing 130 and ring magnet 102. When the value of the difference between the sum of the capacitances relative to ground of the upper capacitance strips 502 and the sum of the capacitances relative to ground of the lower capacitance strips 504 is negative, then the module 570 outputs that the diamagnetic object 104 has moved in the negative z direction (which has an inverse relationship to the acceleration/movement of the ring magnet 102).

Additionally, with appropriate charging using voltage sources and/or current sources, the conducting strips 502 and 504 can force the diamagnetic object 104 to move relative to the ring magnet 102 in any direction, for the purpose of starting an oscillation of the diamagnetic object 104, for example, or preventing the diamagnetic object 104 from moving relative to the ring magnet 102 during accelerations of the ring magnet 104 and housing 130. This purpose of preventing relative motion would be to increase the dynamic range of accelerations that the accelerometer could measure without causing the diamagnetic object 102 to fall off the ring magnet 104 when the acceleration gets large.

There can be various techniques used to retrieve signals from the accelerometer 100. For example, the positional measurements of the diamagnetic object 104 can be communicated to the outside world by wires, radio waves, and/or other wireless communication, including WIFI or cellular networks. The electronics for this transmission can be inside the housing 130, outside the housing 130, peripheral to the ring magnet 102, and/or together with the light sources 202, 302 and detectors 250, 350.

The accelerometer 100 is designed for remote operation at ultralow power. With permanent magnets of the ring magnet 102 used for confinement, low-power light sources 202, 302 (such as, for example, light-emitting photodiodes) used for positional sensing, low-power light detectors 250, 350 (such as, for example, small area solid state photoelectric sensors) used for positional sensing, and low power signal transmission to nearby data collecting stations, the three-dimensional ring accelerometer 100 can operate at low power. For example, the three-dimensional ring accelerometer 100 can operate using batteries. The batteries could be supplemented by solar or other environmental power sources. As such, the accelerometer 100 can operate in remote locations for long periods of time without replacement of energy or parts.

The accelerometer 100 uses magnetic material as discussed herein. The magnetic material of ring magnet 102 used for confinement of the diamagnetic object 104 can be strong permanent magnets, such as those made from neodymium alloys. An example of a neodymium alloy is NdFeB. An example of the magnetization of a strong neodymium alloy is approximately $10^6$ A/m (Amperes/meter). Any permanent magnetic material structured to provide approximately (or at least) $10^6$ A/m or more can be used and examples are not meant to be limited to neodymium alloys. The magnets of the ring magnet 102 can also be electromagnets or superconducting electromagnets. The magnetic field of ring magnet 102 which supports the diamagnetic material of the diamagnetic object 104 can be concentrated and the field strength enhanced using shaped high-permeability alloys such as NiFe compounds including permalloy. In an example, the ring magnet 102 can be a single magnet with the hole 110 formed in the center. As an example, the ring magnet 102 can be two semicircle magnets formed together in the shape of a ring. In an example, the ring magnet 102 can include 3 or more magnets formed in a ring.

Further examples of the diamagnetic material are discussed below. Levitation against gravity requires a diamagnetic material with a high ratio of magnetic susceptibility ($\chi$) to mass density ($\rho$). An example of such a material is pyrolytic carbon with $\chi=-2\times10^{-4}$ (a dimensionless quantity measuring the relative difference in the magnetic susceptibility of the material from the magnetic susceptibility of free space) and $\rho=2000$ kg/m³. The diamagnetic object 104 can have a spherical cross section so that free rotation does not affect the pattern of the shadow on the light detectors. If shapes other than a sphere are utilized for the diamagnetic object 104, the signal can be averaged to account for free rotation that produces a shifting shadow.

Turning to more discussion regarding the physical process of magnetic levitation, the following is provided. The potential energy per unit volume of a diamagnetic mass object with mass density $\rho$ and diamagnetic susceptibility $\chi$ in a gravitational field of acceleration g at position (x, y, z) with vertical component z opposite the direction of gravity, and in a magnetic field of strength B(x, y, z), is given by the following equation:

$$U(x, y, z) = \rho g z - \frac{\chi}{(\chi+3)\mu_0} B(x, y, z)^2.$$

The vacuum permeability is $\mu_0 = 4\pi \times 10^{-7}$. Levitation against the force of gravity requires dU/dz=0. Stability of levitation requires the three eigenvectors of the Jacobian matrix $d^2U/ds_i ds_j$ to be greater than zero; here, (i, j)=(1-3, 1-3) for coordinates $s_i$, $s_j$ representing x, y, or z; FIG. 7 illustrates a model where these conditions are met.

The levitated object which is diamagnetic object 104 oscillates in the potential minimum 702 provided by the magnetic field and gravity at a predefined frequency, which is the resonant frequency of the accelerometer 100. Lower resonant frequencies result from ring magnets 102 with larger radii (or diameters D2). By varying the ring thickness, a wide range of radii (or diameters D2) and resonant frequencies can be employed. A highly sensitive broad-band detector of accelerations, as might be desired for a seismometer, for example, can therefore be constructed with an array of ring magnets 102 of varying size with their respective diamagnetic objects 104.

Figure 6B:
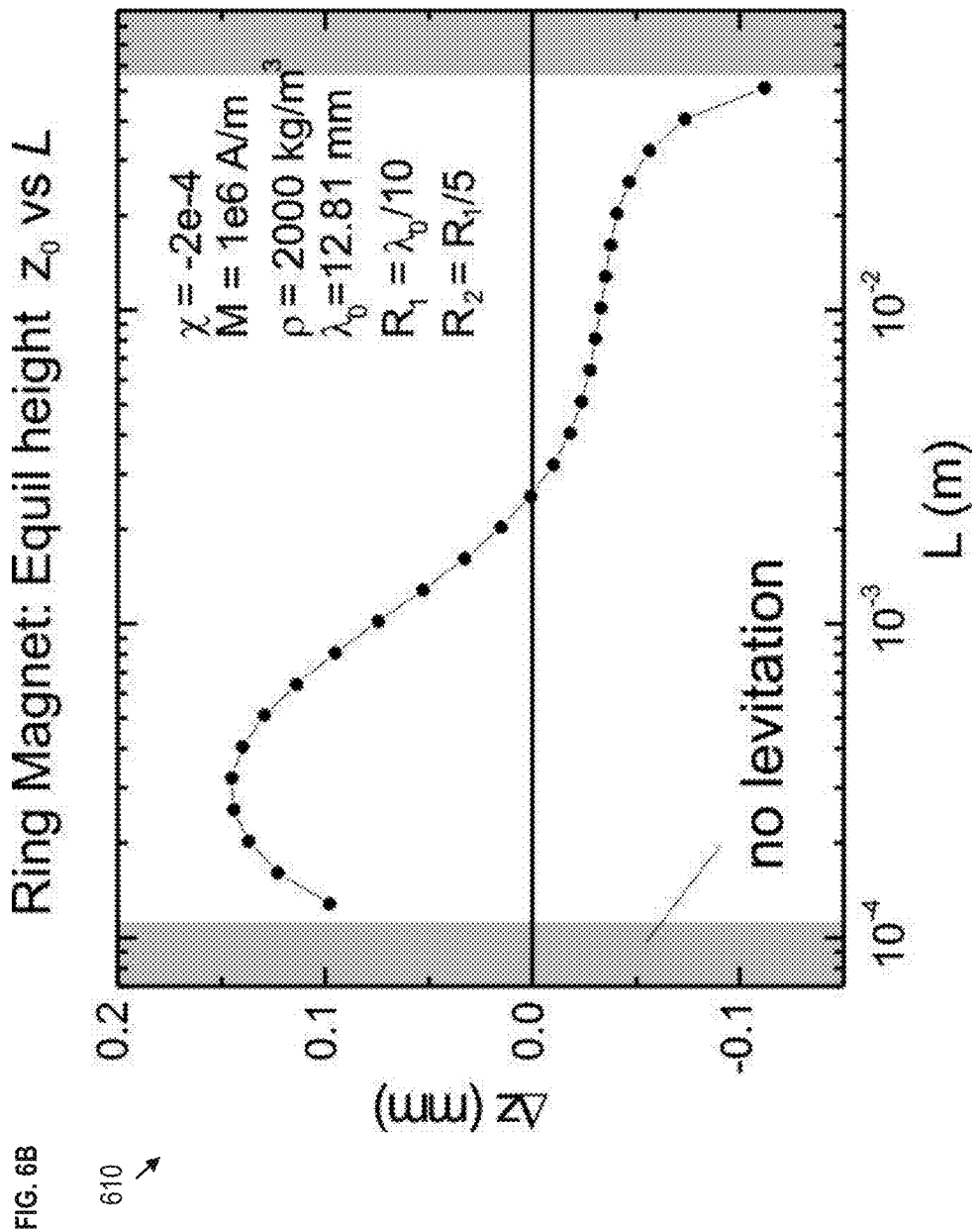
FIG. 6B depicts a diagram illustrating levitation height as a function of the vertical thickness of the ring magnet for fixed inner and outer radii.

FIG. 6A depicts a diagram 600 illustrating the height of levitation above the top of the ring magnet (in micrometers) as a function of the outer radius of the magnet (in meters) for different values of the ratio of the inner to the outer radius of the ring. This diagram assumes a magnetization of $M=10^6$ A/m, and a levitating object with susceptibility $\chi=-2\times10^{-4}$ and density $\rho=2000$ kg/m³, as above. The diagram 600 indicates that the levitation gets stronger and the height larger when the inner radius is relatively small, less than 0.2 times the outer radius. These solutions assume a ring vertical thickness of 3.2 mm. For different thicknesses, FIG. 6B depicts a diagram 610 illustrating the levitation height versus the thickness L of the ring magnet for the same magnet and levitator parameters and a ratio of inner to outer radius equal to 0.2. The strongest levitation and greatest height occur at a small thickness, equal to 0.3 mm in this case.

The accelerometer 100 is very sensitive to motion because the inertial mass of the diamagnetic object 104 does not touch any solid surface. The slightest motion of the magnets of the ring magnet 102 generates a displacement of the diamagnetic object 104 from its equilibrium position. For comparison purposes, the sensitivity of a commercial accelerometer in the state-of-the-art is about 256 LSB/g for small accelerations, where LSB means lowest significant bit and g is the acceleration of gravity. This corresponds to a minimum measurement of g/256 which is 0.39% of g. However, for embodiments of the invention, the sensitivity is determined by the timescale for the diamagnetic object 104 to move away from its equilibrium position (zero point, null position, etc.) in comparison to the sampling time for position. If an acceleration causes a displacement length L of the diamagnetic object 104, then the timescale to move the distance L at an acceleration of a is $\sqrt{2L/a}$. For the light detectors 250, 350 discussed herein, 1 micron positional accuracy can be achieved using optical light beams. With L=1 micron and a=g/256 as above, the timescale is 7 milliseconds. Thus, sampling the position of the diamagnetic object 104 at twice the inverse of this time is 276 Hz in embodiments of the invention, which provides measurements of an acceleration comparable to the best in the state-of-the-art. Embodiments of the invention can provide measurements of accelerations faster than noted above. Higher accelerations require faster sampling or greater spatial resolution of the light detector. An example acceleration that can be detected from the motion of the diamagnetic object 104 is $a=2Lf^2$ for Nyquist sampling frequency f. This example acceleration is $2.0 \times 10^{-7}$ gLf$^2$ for L in microns and f in Hz.

The various components, modules, engines, etc., described herein can be implemented as separate special purpose meters (with or without a computer), instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein can be a combination of hardware and programming. The programming can be processor executable instructions stored on a tangible memory, and the hardware can include processing circuitry for executing those instructions. Thus a system memory can store program instructions that when executed by processing circuitry implement the engines described herein. Other engines can also be utilized to include other features and functionality described in other examples herein. Alternatively or additionally, the modules can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

FIG. 8 depicts a flowchart of a method for determining acceleration using the accelerometer 100 according to embodiments of the invention. At block 802, the detectors 250 and 350 and conducting strips 502, 504 are configured to capture movement of a diamagnetic material (e.g., diamagnetic object 104) positioned to levitate at a three-dimensional minimum of potential well 702 generated by a magnetic field of the magnetic device (e.g., ring magnet 102). At block 804, the modules 270, 370, and 570 are configured to determine acceleration of the magnetic device (e.g., ring magnet 102) in a three-dimensional space based on the movement of the diamagnetic material (e.g., diamagnetic object 104).

The magnetic device forms a ring magnet 102, the ring magnet 102 having a magnetic field orientation of the magnetic field (depicted as magnetic field arrows 120) perpendicular to a top surface and a bottom surface of the ring magnet 102. The ring magnet 102 includes a hole 110, the diamagnetic material being positioned to levitate over the hole 110.

The diamagnetic material (e.g., diamagnetic object 104) has a high ratio of magnetic susceptibility to mass density compared to other materials in the ring magnet and/or housing. For the above parameters relevant to FIG. 7, $\chi/\rho = -10^{-7}$ m$^3$/kg produces a stable levitation. Similar calculations show that the ratio of $\chi/\rho$ cannot be smaller than this for the same size magnet with the same magnetization by more than a factor of about 3, or else the diamagnetic object 104 will not be levitated against the force of gravity. This reduction factor can be greater if the inner ring radius is smaller because a smaller inner ring radius produces stronger levitation (FIG. 6A). The diamagnetic material includes a shape having/causing stability in position and orientation inside the magnetic field of the magnetic device. The diamagnetic material includes a spherical shape.

One or more detectors (e.g., detectors 250 and 350) are positioned relative to the diamagnetic material, and the one or more detectors are configured to obtain a three-dimensional position of the diamagnetic material.

A housing 130 includes the magnetic device (e.g., ring magnet 102), the diamagnetic material (e.g., diamagnetic object 104), and a medium encompassing the diamagnetic material being levitated. A viscous resistance of the medium defines a resonant frequency sensitivity of the movement for the diamagnetic material. The housing 130, ring magnet 102 and diamagnetic object 104 could also be in a vacuum with no viscous medium.

Figure 9:
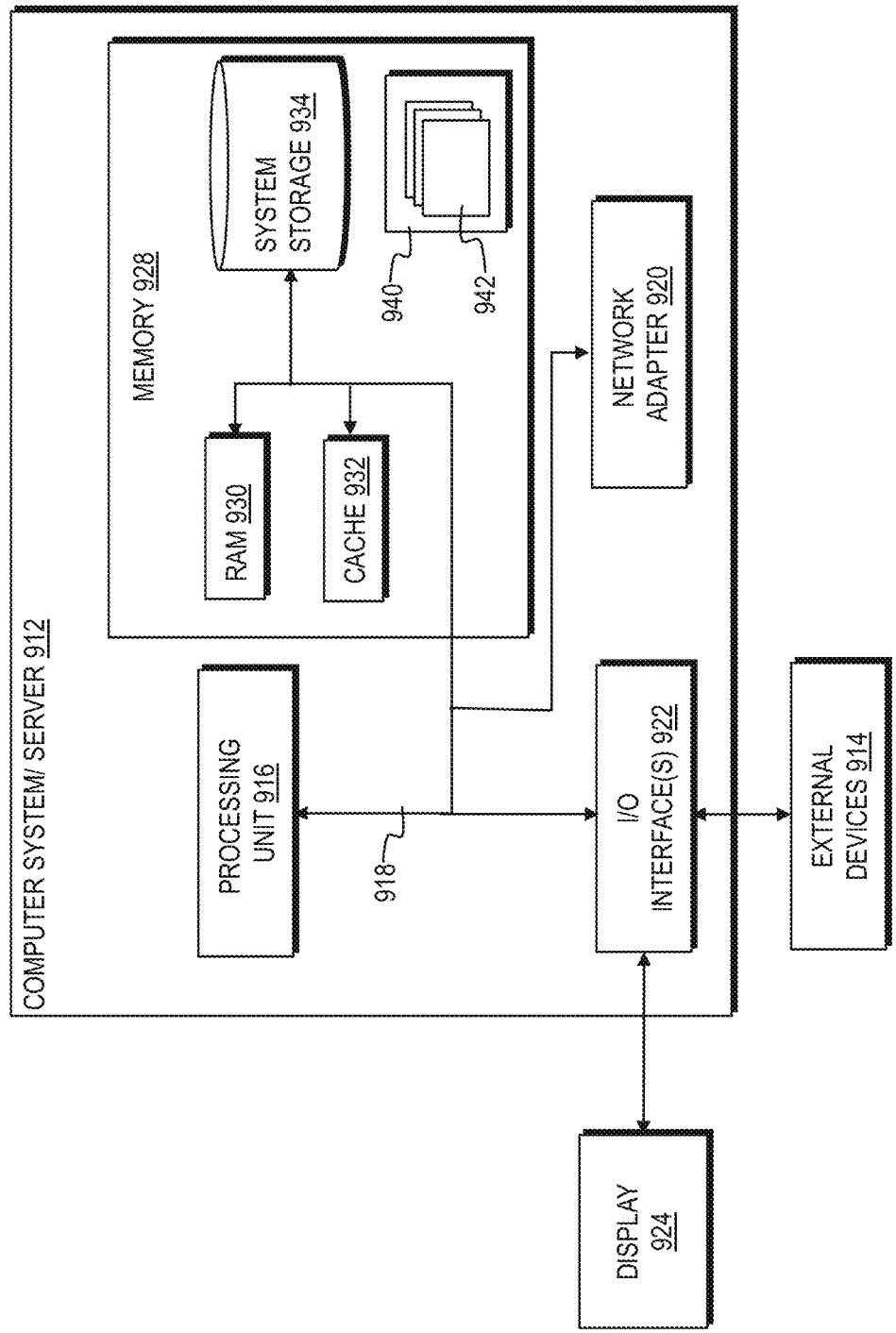
FIG. 9 depicts a schematic of an example computing system utilized according to embodiments of the invention.

FIG. 9 depicts a schematic of an example computing system 912 according to embodiments of the present invention. The computer system/server 912 can be operational with numerous other general purpose or special purpose computing system environments or configurations. The functions and capabilities of computing system 912 can be utilized in FIGS. 1-8 to implement features of the detection modules 260_1 through 260_N, module 270, modules 360_1 through 360_N, module 370, module 570, etc., according to embodiments of the invention.

Examples of well-known computing systems, environments, and/or configurations that can be representative of and/or include elements of computer system/server 912 include, but are not limited to, personal computer systems, phones (e.g., cellphones, smart phones, etc.), server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 912 can be practiced in distributed cloud computing environments where tasks are performed by remote processing devices that are linked through a communications network. In a distributed cloud computing environment, program modules can be located in both local and remote computer system storage media including memory storage devices.

The components of computer system/server 912 can include, but are not limited to, one or more processors or processing units 916, a system memory 928, and a bus 918 that couples various system components including system memory 928 to processor 916. Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 912 typically includes a variety of computer system readable media. Such media can be any available media that is accessible by computer system/server 912, and it includes both volatile and non-volatile media, removable and non-removable media. The system memory 928 can include computer system readable media in the form of volatile memory, such as random access memory (RAM) 930 and/or cache memory 932. Computer system/server 912 can further include other removable/non-removable, volatile/non-volatile computer system storage media. By way of example only, storage system 934 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. Memory 928 can include at least one program product having a set (e.g., at least one) of program modules that are configured to carry out the functions of embodiments of the invention.

Program/utility 940, having a set (at least one) of program modules 942, can be stored in memory 928 by way of example, and not limitation, as well as an operating system, one or more application programs, other program modules, and program data. Each of the operating system, one or more application programs, other program modules, and program data or some combination thereof, can include an implementation of a networking environment. Program modules 942 generally carry out the functions and/or methodologies of embodiments of the invention as described herein.

Computer system/server 912 can also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A device comprising:
   a ring magnet comprising a first substantially planar surface opposite a second substantially planar surface, the ring magnet having a single hole in a center such that the single hole passes through the first and second substantially planar surfaces;
   a diamagnetic material positioned to levitate at a three-dimensional minimum of a potential well generated by a magnetic field of the ring magnet, the diamagnetic material being positioned relative to the first substantially planar surface on one side of the ring magnet such that no other magnetic device opposes the ring magnet;
   at least one light source opposing the first substantially planar surface on the one side of the ring magnet and opposing the single hole of the ring magnet, the diamagnetic material being sandwiched between the at least one light source and the first substantially planar surface of the ring magnet; and
   at least one detector opposing the second substantially planar surface of the ring magnet.

2. The device of claim 1, wherein the ring magnet is a single device, levitation of the diamagnetic material relying solely on generation of the magnetic field by the single device.

3. The device of claim 1, wherein the the ring magnet has a magnetic field orientation of the magnetic field perpendicular to the first and second substantially planar surfaces of the ring magnet.

4. The device of claim 3, wherein the diamagnetic material is positioned to levitate over the single hole.

5. The device of claim 1, wherein the diamagnetic material comprises a shape having stability in position and orientation inside the magnetic field of the ring magnet.

6. The device of claim 1, wherein the diamagnetic material comprises a spherical shape.

7. The device of claim 1 further comprising one or more detectors positioned relative to the diamagnetic material, the one or more detectors configured to obtain a three-dimensional position of the diamagnetic material.

8. The device of claim 1, wherein capacitance plates are positioned in relation to the diamagnetic material such that capacitance of the capacitance plates changes relative to movement of the diamagnetic material.

9. The device of claim 1, wherein:
   a housing comprises the ring magnet, the diamagnetic material, and a medium encompassing the diamagnetic material being levitated; and
   the medium is selected from the group consisting of a vacuum and a fluid.

10. The device of claim 9, wherein a viscous resistance of the medium defines a resonant frequency sensitivity of a movement for the diamagnetic material.

11. A method for determining acceleration comprising:
    capturing a movement of a diamagnetic material positioned to levitate at a three-dimensional minimum of a potential well generated by a magnetic field of a ring magnet comprising a first substantially planar surface opposite a second substantially planar surface, the ring magnet having a single hole in a center such that the single hole passes through the first and second substantially planar surfaces, the diamagnetic material being positioned relative to the first substantially planar surface on one side of the ring magnet such that no other magnetic device opposes the ring magnet; and
    determining acceleration of the ring magnet in a three-dimensional space based on the movement of the diamagnetic material, wherein the movement of the diamagnetic material is captured using at least one light source opposing the first substantially planar surface on the one side of the ring magnet and opposing the single hole of the ring magnet, the diamagnetic material being sandwiched between the at least one light source and the first substantially planar surface of the ring magnet, wherein at least one detector opposing the second substantially planar surface of the ring magnet is utilized, at least in part, to determine the acceleration.

12. The method of claim 11, wherein:
    the ring magnet has a magnetic field orientation of the magnetic field perpendicular to the first and second substantially planar surfaces of the ring magnet; and
    the diamagnetic material is positioned to levitate over the single hole.

13. The method of claim 11, wherein the diamagnetic material comprises a shape having stability in position and orientation inside the magnetic field of the ring magnet.

14. The method of claim 11, wherein the diamagnetic material comprises a spherical shape.

15. The method of claim 11, wherein one or more detectors are positioned relative to the diamagnetic material, the one or more detectors configured to obtain a three-dimensional position of the diamagnetic material.

16. The method of claim 11, wherein capacitance plates are positioned in relation to the diamagnetic material such that capacitance of the capacitance plates changes relative to the movement of the diamagnetic material.

17. The method of claim 11, wherein:
    a housing comprises the ring magnet, the diamagnetic material, and a medium encompassing the diamagnetic material being levitated; and
    the medium is selected from the group consisting of a vacuum and a fluid.

18. The method of claim 17, wherein a viscous resistance of the medium defines a resonant frequency sensitivity of the movement for the diamagnetic material.

* * * * *